United States Patent [19]

Petigoretz

[11] Patent Number: 4,538,372
[45] Date of Patent: Sep. 3, 1985

[54] RELEASABLE DOWNRIGGER CLIP

[76] Inventor: Walter Petigoretz, 1564 Teakwood, Stevensville, Mich. 49127

[21] Appl. No.: 539,346

[22] Filed: Oct. 5, 1983

[51] Int. Cl.³ .............................................. A01K 91/00
[52] U.S. Cl. .................................. 43/27.4; 24/129 C; 24/343; 43/43.72
[58] Field of Search .................... 43/43.12, 27.4, 43.1, 43/44.88; 24/129 R, 129 C, 131 R, 343, 336, 550

[56] References Cited

U.S. PATENT DOCUMENTS

| | | | |
|---|---|---|---|
| 581,827 | 5/1897 | Landreth | 24/131 R |
| 1,330,147 | 2/1920 | Stitzer | 24/550 |
| 2,608,017 | 8/1952 | Hinkson | 43/44.88 |
| 2,957,267 | 10/1960 | Dempsey | 43/43.12 |
| 2,988,395 | 6/1961 | Rogers | 43/43.12 |
| 3,892,083 | 7/1975 | Peterson | 43/43.12 |

FOREIGN PATENT DOCUMENTS 1010651  5/1977  Canada .................. 43/43.1

Primary Examiner—Gene P. Crosby
Attorney, Agent, or Firm—Flynn, Thiel, Boutell & Tanis

[57] ABSTRACT

A releasable downrigger clip is disclosed having a finite length of spring wire and having a first segment thereof at a first end doubled back upon itself to define an eyelet and a releasable clasp enabling an intermediate segment of an elongate downrigger wire to be received in the eyelet by passing between the spring wire and the releasable clasp. A second segment of wire at the opposite end of the finite length is also doubled back on itself to define a hook. A closed loop is provided in the segment of the wire intermediate the opposite ends with the opposite ends of the loop resiliently engaging each other but being separable against the resilient urging caused by the resilience of the spring wire. In use, the clip is adapted to releasably engage the downrigger wire which extends from the downrigger arrangement to a weight connected at a free end thereof beneath the surface of the water. A first portion of the downrigger wire is received and held in the eyelet while a second portion of it is resiliently clamped between the aforesaid opposite ends of the loop. The hook is adapted to be connected to a fishing line release structure.

8 Claims, 4 Drawing Figures

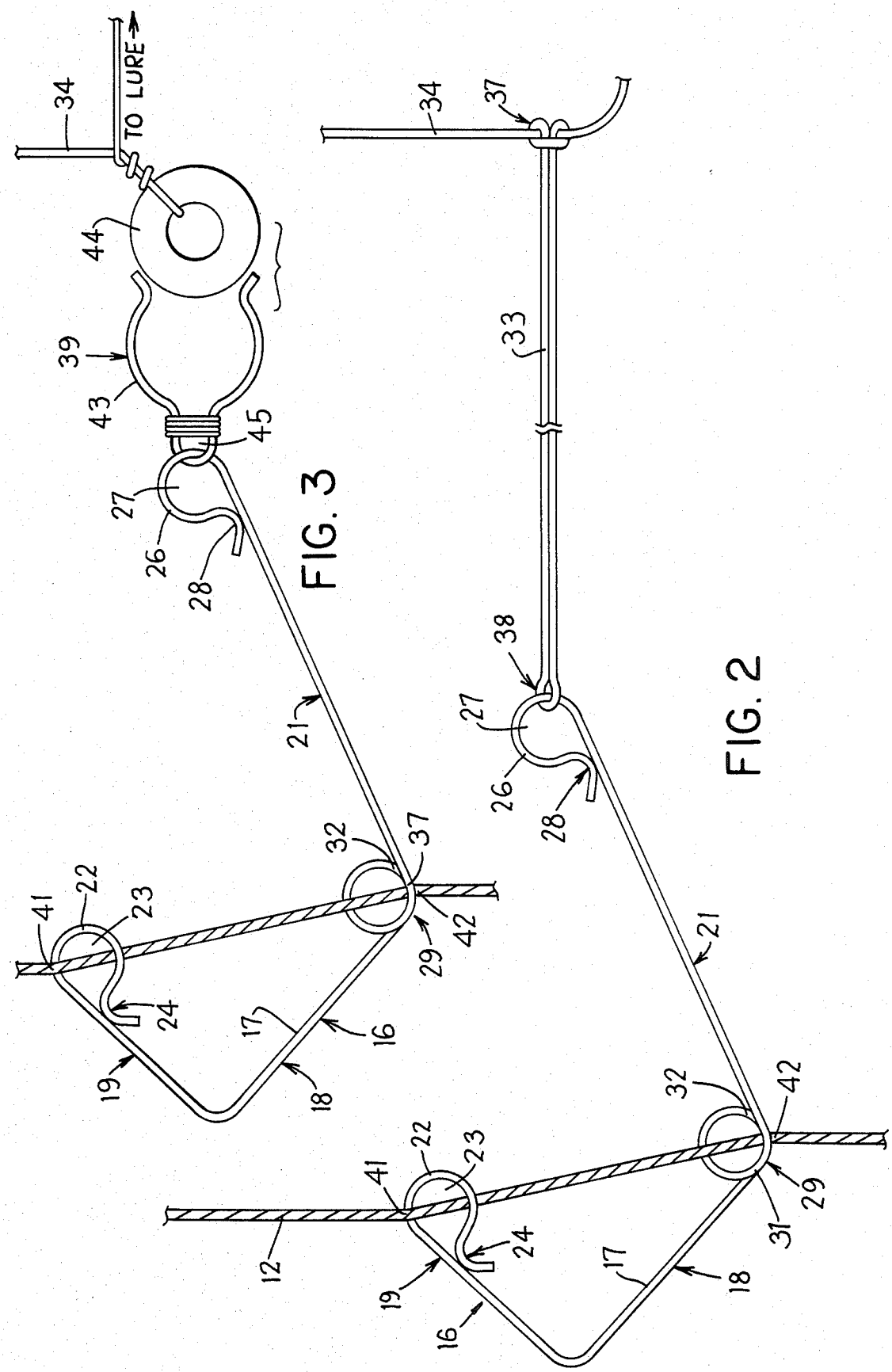

RELEASABLE DOWNRIGGER CLIP

FIELD OF THE INVENTION

This invention relates to a releasable downrigger clip and, more particularly, to a clip that is adapted to become releasably fastened to an elongate strand or wire from a downrigger arrangement mounted on a boat, the strand or wire extending from the downrigger arrangement beneath the surface of the water to a weight connected at the free end thereof.

BACKGROUND OF THE INVENTION

Downrigger arrangements which are adapted for mounting on boats and the like are well known in the art. Various structures are provided on the downrigger weight for facilitating connection of a fishing lure. The purpose of the downrigger arrangement is to hold the fishing lure deep in the water as the boat is propelled forwardly. Various lure release structures usable in association with the downrigger arrangement for releasing the attachment of the lure from the downrigger weight when the lure is struck by and taken by a fish are also known. A common type of release mechanism is a rubber band which is snugly looped around the fishing line connected to the lure, some variable distance in front of the lure. The free end of the rubber band is then hooked over structure on the downrigger weight. Instead of the use of rubber bands, other release mechanisms can also be employed, such as shown in FIG. 3 of this application, namely, a hairpin-type clasp releasably coupleable with a button fastened to the fishing line, the hairpin clasp being secured to the weight on the end of the downrigger wire. These arrangements have proven to be satisfactory over the years. However, such arrangements are extremely limiting during fishing in that the depth of the lure beneath the surface of the water is controlled by the depth of the weight on the end of the downrigger wire beneath the surface of the water. Thus, in order to troll at various depths, multiple downrigger arrangements are required, which can become impracticable due to space limitations on the boat, or multiple fishing lines are required, each having an apparatus thereon connected in series with the line to the lure and which dives to a certain depth beneath the water to keep the lure at that depth. If many of these lines exist, the fear of lines becoming tangled is ever present.

Accordingly, it is an object of the present invention to provide an apparatus usable on a downrigger arrangement for keeping a fishing lure at a desired depth, but the depth at which the lure is maintained is independent of the depth of the downrigger weight.

It is a further object of the present invention to provide a releasable downrigger clip adapted to be releasably secured to a downrigger wire extending between the downrigger arrangement on a boat and a weight secured to the lower free end of the downrigger wire.

It is a further object of this invention to provide a releasable downrigger clip, as aforesaid, having structure enabling multiple clips to be secured to the same downrigger wire at varying elevations thereon.

It is a further object of this invention to provide a releasable downrigger clip, as aforesaid, that is simple in construction and, therefore, easy to use, especially on boats that are constantly undergoing a rocking motion due to wave action on the body of water.

It is a further object of this invention to provide a releasable downrigger clip, as aforesaid, which is made of spring wire and is inexpensive to manufacture.

It is a further object of this invention to provide a releasable downrigger clip, as aforesaid, which, upon a release of the fishing line from connection thereto, the reactive force of the fishing line breaking away from the release mechanism will be sufficient to release the fixed engagement of the releasable downrigger clip from the downrigger wire to enable the clip to thereafter slide downwardly on the downrigger wire to the next adjacent obstruction on the downrigger wire and to thereby minimize the necessity of the downrigger operator removing such clips at, for example, the time the downrigger weight is being raised from beneath the surface of the water.

SUMMARY OF THE INVENTION

In general, the objects and purposes of the invention are met by providing a releasable downrigger clip made of a finite length of wire and having a first segment thereof at a first end doubled back upon itself to define an eyelet and a releasable clasp enabling an intermediate section of an elongate strand (the downrigger wire) to be received in the eyelet by passing between the wire and the releasable clasp. A second segment of the wire at a second end thereof is also doubled back upon itself to define a hook. A closed loop is provided in the wire intermediate the first and second ends with the opposite ends of the loop being resiliently engaged with each other but being separable against the resilient urging caused by the resilience of the wire.

BRIEF DESCRIPTION OF THE DRAWINGS

Further objects and purposes of this invention will be apparent to persons acquainted with apparatus of this general type upon reading the following specification and inspecting the accompanying drawings, in which:

FIG. 2 is an enlarged view of the releasable downrigger clip;

FIG. 3 is an enlarged view of the downrigger clip but having a different type of fishing line release mechanism fastened thereto as compared to the fishing line release mechanism shown in FIG. 2.

Figure 1:
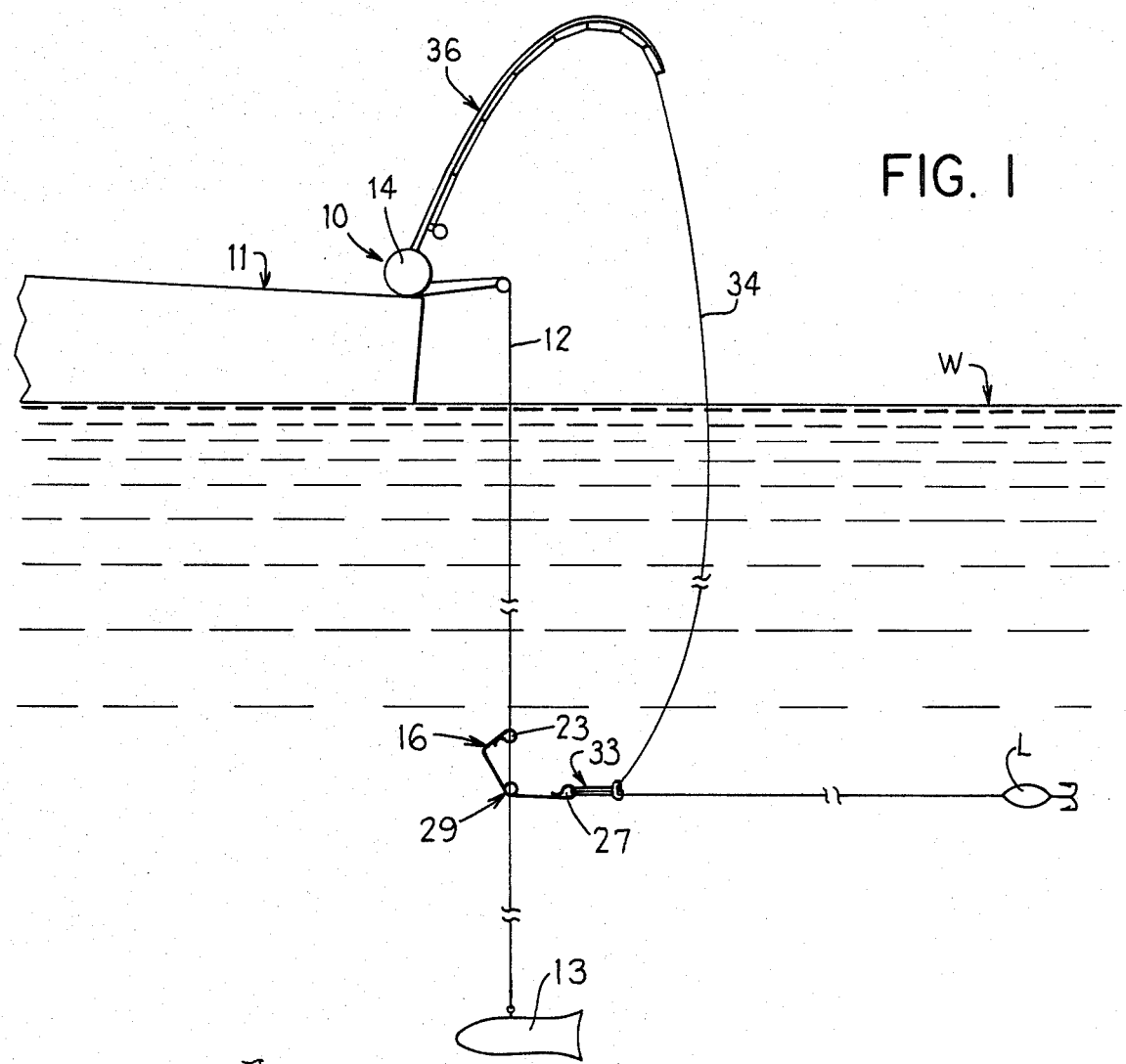
FIG. 1 is a schematic illustration of a releasable downrigger clip fastened to a downrigger wire with appropriate fishing line release structure being provided to secure a fishing line at a location adjacent the fishing lure to the releasable downrigger clip.

Certain terminology will be used in the following description for convenience in reference only and will not be limiting. The words "up" and "down" will designate directions in the drawings to which reference is made. The words "left" and "right" will also designate directions in the drawings to which reference is made. The aforementioned terminology will also include derivatives thereof and words of similar import.

DETAILED DESCRIPTION

Referring now to FIG. 1, a downrigger arrangement 10 is mounted on the aft end of a boat 11 floating on a body of water W. A downrigger wire or strand 12 extends downwardly from the downrigger arrangement 10 beneath the surface of the water W to a weight 13 fastened to the lower terminal end thereof. A reel 14 is provided on the downrigger arrangement for elevating and lowering the weight relative to the surface of the water W. All of the aforedescribed structure is old in the art and does not constitute a part of my invention.

My invention relates to a releasable downrigger clip identified by the reference numeral 16 in FIG. 1. FIG. 2 illustrates the clip 16 in larger detail. A finite length of stainless spring steel wire 17 is bent to form a U-shape comprised of a bight segment 18 and two leg segments 19 and 21. The free end of the leg 19 has a segment 22 bent back upon itself to form an eyelet 23 and a releasable clasp 24. The releasable clasp 24 touches the leg 19 and is adapted to yield to the forced movement of a downrigger wire 12 between the releasable clasp 24 and the leg 19. The end of the leg 21 has a similar type structure, namely, a segment of wire 26 is bent back upon itself to form a hook or eyelet 27 and a releasable clasp 28. In this particular embodiment, I have chosen to make the leg 21 longer than the leg 19 for reasons which will be explained below.

A loop 29 is provided in the finite length of spring steel wire at the juncture between the bight segment 18 and the leg segment 21. The loop, in this particular embodiment, is circular in shape with the opposite ends 31 and 32 resiliently engaging each other but being separable against the resilient urging caused by the resilience of the spring steel wire. In this particular embodiment, the opposite ends 31 and 32 of the loop will be separated when the downrigger wire or strand 12 is urged between the separable opposite ends 31 and 32 as illustrated in FIG. 2. The legs 19 and 21, bight segment 18 and integral loop 29 all extend generally parallel to a common plane.

Figure 4:
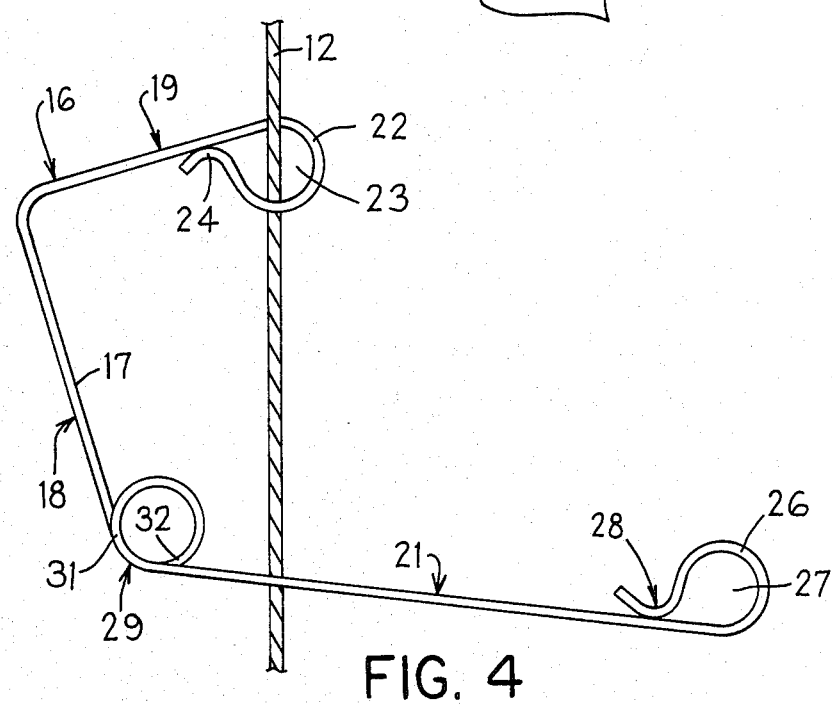
FIG. 4 is a view of the releasable downrigger clip released from a fixed engagement with the downrigger wire.

In use of the releasable downrigger clip 11, the downrigger wire 12 is, as stated above, inserted into the eyelet 23 past the releasable clasp 24 as illustrated in FIG. 4. In this particular position, the clip 16 can be moved along the downrigger wire 12 to any desired location thereon. Once a location on the downrigger wire is determined, the next adjacent portion of the downrigger wire 12 can be inserted between the separable opposite ends 31 and 32 of the loop 29 as illustrated in FIG. 2. In this embodiment, the bight segment 18, the leg 19 and the segment of downrigger wire 12 extending between the eyelet 23 and loop 29 define a triangle oriented on the leading (left) side of the downrigger wire, and the leg 21 extends away from the wire 12 on the opposite side thereof in a plane generally coplanar with a plane defined by the triangle. The loop 29 is oriented below the eyelet 23. The resilient urging of the opposite ends 31 and 32 toward each other will effectively cause a gripping of the downrigger wire 12 thereat to hold the clip 16 at the desired elevation on the downrigger wire 12. Thereafter, a rubber band 33 can be secured to a fishing line 34 operatively connected to a fishing rod 36. As shown in FIG. 2, the rubber band 33 is looped at one end 37 thereof around the fishing line 34 and snugly tightened so that no relative movement will occur between the rubber band 33 and the fishing line 34. The opposite end 38 of the rubber band is looped over the segment of wire 26, moved past the releasable clasp 29 so that a part of the rubber band passes through the hook or eyelet 27. When the boat is moved at trolling speed, i.e. to the left in FIG. 1, the fishing lure will generate a drag force. I have discovered that the drag force can be used to effect a tighter gripping of the clip 16 to the downrigger wire. I believe this tighter gripping is caused by the drag force tending to pull the loop 29 portion of the clip into tighter gripping relation with the downrigger wire. That is, the further into the loop 29 the wire 12 is moved, the tighter the ends 31 and 32 thereof grip the wire. In addition, as the slack in the fishing line is taken up by fishing rod 36, an upward force is applied to the hook 27 tending to pivot the clip counterclockwise (FIG. 2) about the central axis of the loop 29. In most instances, the downrigger wire becomes slightly elastically flexed as at 41 and 42.

When a fish strikes the lure L (FIG. 1) and attempts to swim away with the lure securely hooked to it, the rubber band 33 will stretch to the breaking point, break and enable the fisherman to reel in the fish utilizing the fishing rod 36. Normally, the reactive force generated by the breaking of the rubber band 33 and the simultaneous release of the drag force will be sufficient to cause the loop 29 to become free of its gripping relation with the downrigger wire 12 as illustrated in FIG. 4. The downrigger wire 12 will, however, still remain within the eyelet 23 so that the clip 16 will remain fastened or clipped to the downrigger wire 12. Thereafter, the clip 16 will slide downwardly on the downrigger wire to the next adjacent obstruction on the downrigger wire. In this particular embodiment, the next adjacent obstruction will be the weight 13 as illustrated in FIG. 1.

If several of such clips 16 are fastened at various vertically spaced locations along the length of the downrigger wire 12, it being recognized that only one such clip is illustrated in FIG. 1, the clip 16 oriented in the manner illustrated in FIG. 4 will slide downwardly to the next adjacent clip, assuming, of course, that the clip in FIG. 4 is spaced above the arrangement illustrated in FIG. 1.

A different type of fishing line release mechanism 39 is illustrated in FIG. 3. The releasable downrigger clip 16 is, however, identical to the clip illustrated in FIG. 2 and, accordingly, the same reference numerals have been utilized to designate the identical structural features. The fishing line release mechanism 39 comprises a hairpin-type clasp 43 releasably coupleable to a button 44 fixedly fastened to the fishing line 34. An eyelet 45 formed on the hairpin clasp 43 is hooked onto the eyelet or hook 27 as illustrated in FIG. 3.

It is to be understood that the two forms of fishing line release mechanisms described above, namely, the employment of the rubber band 3 and the hairpin clasp 41 and button 42 combination are old in the art and does not constitute a part of my invention. Instead, my invention is directed to the releasable downrigger clip per se and the manner in which it cooperates with the downrigger wire or strand 12.

Although a particular preferred embodiment of the invention has been disclosed in detail for illustrative purposes, it will be recognized that variations or modifications of the disclosed releasable downrigger clip, lie within the scope of the present invention.

The embodiments of the invention in which an exclusive property or privilege is claimed are defined as follows:

1. A releasable downrigger clip, comprising:
a finite length of wire having
(1) a first segment thereof at a first end thereon doubled back on itself to define an eyelet and a releasable clasp means enabling an intermediate segment of an elongated strand to be received in said eyelet by passing between said wire and said releasable clasp means;

(2) a second segment thereof at a second end thereon doubled back on itself to define a hook means;

(3) a closed loop intermediate said first and second ends, the opposite ends of said loop resiliently engaging each other but being separable against the resilient urging caused by the resilience of said wire; and (4) said releasable clip being adapted to releasably connect to and cooperate with said elongate strand from a downrigger arrangement mounted on a boat, said strand extending from said downrigger arrangement beneath the surface of the water to a weight connected at a free end thereof, a first portion of said strand being received and held in said eyelet, a second portion of said strand being resiliently clamped between said opposite ends of said loop; and wherein said hook means is adapted to connect to a fishing line release means.

2. The releasable downrigger clip according to claim 1, wherein said wire is a spring wire.

3. The releasable downrigger clip according to claim 1, wherein said finite length of wire has a generally U shape having a bight segment and a pair of legs, said eyelet and said releasable clasp means being located at an end of one of said legs, said hook means being located at an end of the other one of said legs; and wherein said closed loop is located at the juncture between said other one of said legs and said bight segment.

4. The releasable downrigger clip according to claim 3, wherein said other one of said legs is longer than said one of said legs.

5. The releasable downrigger clip according to claim 3, wherein said legs and bight segment all extend generally parallel to a common plane.

6. The releasable downrigger clip according to claim 1, wherein the shape of said eyelet and releasable clasp means and the shape of said hook means are identical.

7. The releasable downrigger clip according to claim 1, wherein when said releasable clip is attached to said strand, said bight segment, said one leg and a segment of said strand extending between said eyelet and said loop define a triangle oriented on one side of said strand, said other leg extending away from said strand on the opposite side thereof in a plane generally coplanar with a plane defined by said triangle.

8. The releasable downrigger clip according to claim 1, wherein when said clip is attached to said strand, said loop is oriented below said eyelet and releasable clasp means.

* * * * *